Sept. 26, 1961 J. H. SMITH 3,001,753
HOLDER FOR FLOWER POTS AND OTHER ARTICLES
Filed May 17, 1960
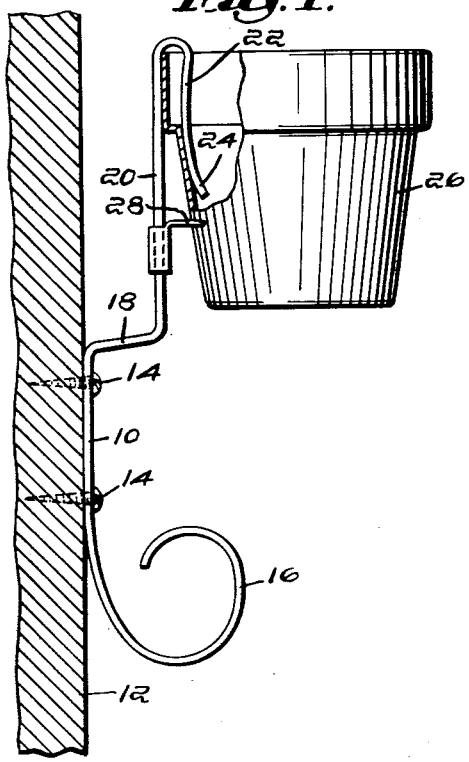
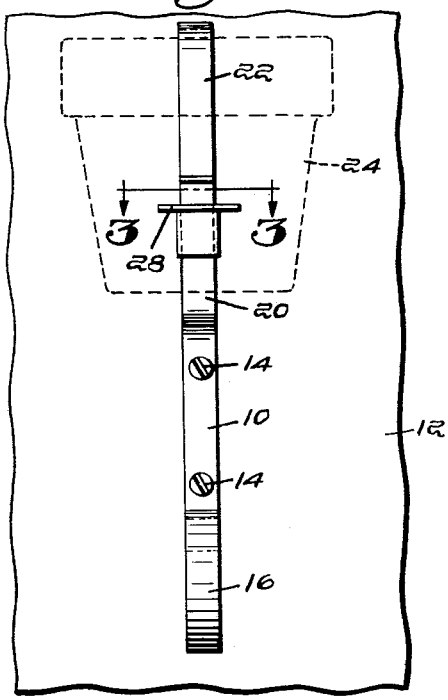
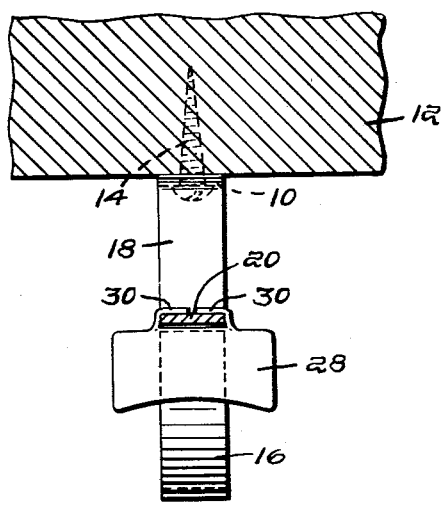
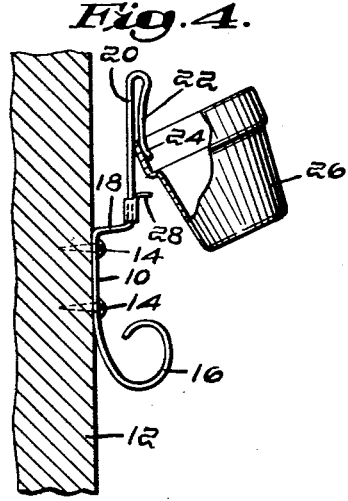
Inventor:
Joseph H. Smith,

United States Patent Office 3,001,753
Patented Sept. 26, 1961

3,001,753
HOLDER FOR FLOWER POTS AND OTHER ARTICLES
Joseph H. Smith, 336 Quincy St., Brockton, Mass.
Filed May 17, 1960, Ser. No. 29,624
2 Claims. (Cl. 248—313)

This invention relates to a holder which stands in a generally vertical position as, for example, by being secured to a vertical wall, and serving to support a device having at its top an upwardly disposed opening such, for example, as a flower pot or flower vase in which case the opening is the open top of the pot. For convenience hereinafter the device supported will be referred to as a container and, specifically, as a flower pot, and such a container is illustrated.

The invention will be well understood by reference to the following description taken in connection with the accompanying drawings wherein:

FIG. 1 is a side view showing the device in use, supporting a flower pot;

FIG. 2 is a front elevation showing the flower pot in dotted lines;

FIG. 3 is a section on the lines 3—3 of FIG. 2, the pot being omitted; and

FIG. 4 is a view similar to FIG. 1 on a smaller scale illustrating a convenient and preferred method of putting a flower pot in place to be supported.

In the form of the device illustrated it is formed from a single strip of metal which may be, and is in the example shown, of uniform width and comprises a base portion 10 secured to a supporting surface such as the vertical wall 12. Herein, instead of a socket or similar securing means, screws 14 driven into the wall provide a relatively permanent mounting. The lower end of the strip is here shown bent into a volute 16 the purpose of which is ornamental. At the upper end of the base 10 is an outwardly bent part 18 which supports in offset position a free-standing upright 20 the upper end of which is bent downwardly to form a hook 22 having a downwardly opening throat and, preferably, a slightly outwardly deflected bill 24. This hook serves to engage the marginal portion of the flower pot 26 as clearly seen in FIG. 1.

To maintain the flower pot suspended there is slidably mounted on the offset portion 20 a detent member which includes a detent portion proper 28 herein in the form of a small horizontally disposed plate which is provided with ears 30 embracing the upright portion 20 to provide a sleeve permitting the detent member to be moved along the upright to various positions of elevation in parallel horizontal planes.

In use, the sleeve being located initially at the bottom of the upright 20, the edge of the flower pot may be introduced into the opening of the hook from below, conveniently in the manner shown in FIG. 4, which hereinafter will be more fully referred to. When it bottoms in the hook the detent may be slid upwardly until it jams against the side of the pot and, in the case of a flower pot, against the frustro-conical and downwardly tapering body thereof. The grip is such that the pot is held with its edge within the hook suspended by the container. Because of the resilient character of the strip of metal the hook may be somewhat expanded, as seen by comparing FIG. 1 with FIG. 4, and resiliently clasps the edge of the pot and presses the wall thereof against the detent to ensure a firm grip on the pot.

Referring to FIG. 4 there is shown a possible, and indeed a preferred, method of introducing the pot. It may be tilted somewhat to one side and in this position may be used as a lever to spring open the hook and facilitate the entrance of the wall of the pot all the way into the hook. The pot may be maintained somewhat tilted and the detent moved upwardly until it makes contact with the wall and will thus be held in a jammed position without requiring much upward force to be utilized in adjusting the detent. This insures adequate clamping of the pot and there is no likelihood of its being accidentally released.

As seen from FIG. 3 the detent 28 is somewhat wider than the upright portion 20 which supports it and it may at times be convenient to reach in from above and seize the two projecting portions with a pair of outstretched fingers so that a closing movement of these fingers will draw the detent upwardly and move it firmly into its jammed position. If the pot is a little off the vertical when the detent makes contact with the wall of the container all the better, as the reaction of the spring end of the hook insures the desired clamping and prevents accidental downward displacement of the detent.

I am aware that the invention may be embodied in other specific forms without departing from the spirit or essential attributes thereof, and I therefore desire the present embodiment to be considered in all respects as illustrative and not restrictive, as is in fact clear in several matters from the description itself. Reference is to be had to the appended claims to indicate those principles of the invention exemplified by the particular embodiment described and which I desire to secure by Letters Patent.

What is claimed is:

1. A supporting holder for open topped containers comprising a free-standing upright downturned at its upper end to form a hook with a downwardly presented throat to receive from below an edge portion of the container top, the parts of the hook being relatively resiliently yieldable, and a member slidably mounted on the upright having a forwardly presented detent portion in vertical alignment with the hook throat for manual adjustment toward the hook into engagement with the body of a container the edge of which is inserted in the hook to apply clamping pressure thereto in a direction crosswise to the hook.

2. A supporting holder for an open topped container comprising a strip of resiliently yieldable material bent to provide a base for locating it on a vertical surface, an offset upright and a downwardly opening hook at the upper end of the upright, and comprising also a slide on the upright having a forwardly projecting detent portion extending transversely to the throat of the hook and in vertical alignment therewith for vertical adjustment into jamming engagement with the wall of a container which has an edge portion inserted in the hook to effect suspension of the container.

References Cited in the file of this patent
UNITED STATES PATENTS

| | | |
|---|---|---|
| 1,446,036 | Dodd | Feb. 20, 1923 |
| 2,142,868 | Di Vincenzo | Jan. 3, 1939 |